United States Patent
Ip et al.

(10) Patent No.: US 12,299,923 B2
(45) Date of Patent: May 13, 2025

(54) SYSTEM AND METHOD FOR ESTIMATING RELATIVE TRAILER ANGLE

(71) Applicant: Continental Automotive Systems, Inc., Auburn Hills, MI (US)

(72) Inventors: Julien Ip, Madison Heights, MI (US); Eduardo Llanos, Auburn Hills, MI (US); Xin Yu, Rochester Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 284 days.

(21) Appl. No.: 17/302,231

(22) Filed: Apr. 27, 2021

(65) Prior Publication Data

US 2022/0343535 A1 Oct. 27, 2022

(51) Int. Cl.
*G06T 7/73* (2017.01)
*B60R 1/00* (2022.01)

(52) U.S. Cl.
CPC .................. *G06T 7/74* (2017.01); *B60R 1/00* (2013.01); *B60R 2300/105* (2013.01); *B60R 2300/30* (2013.01); *B60R 2300/806* (2013.01); *G06T 2207/10028* (2013.01); *G06T 2207/30244* (2013.01); *G06T 2207/30252* (2013.01)

(58) Field of Classification Search
CPC ............ G06T 7/74; G06T 2207/10028; G06T 2207/30244; G06T 2207/30252; G06T 7/60; G06T 7/73; G06T 2200/04; G06T 2207/10016; B60R 1/00; B60R 2300/105; B60R 2300/30; B60R 2300/806
USPC ........................................................ 382/103
See application file for complete search history.

(56) References Cited

U.S. PATENT DOCUMENTS

| 9,446,713 | B2 | 9/2016 | Lu et al. |
| 9,728,005 | B2 | 8/2017 | Dhome et al. |
| 2014/0160276 | A1 | 6/2014 | Pliefke et al. |
| 2017/0050672 | A1 | 2/2017 | Gieseke et al. |
| 2017/0341583 | A1* | 11/2017 | Zhang ................ B60R 1/00 |
| 2018/0001928 | A1 | 1/2018 | Lavoie et al. |
| 2019/0064831 | A1 | 2/2019 | Gali et al. |

(Continued)

FOREIGN PATENT DOCUMENTS

| WO | 2018202464 A1 | 11/2018 |
| WO | 2021055969 A1 | 3/2021 |

OTHER PUBLICATIONS

The International Search Report and the Written Opinion of the International Searching Authority mailed on Jul. 19, 2022 for the counterpart PCT Application No. PCT/US2022/071624.
The file history for U.S. Appl. No. 17/753,964, including the non-final Office Action dated Feb. 2, 2024 and Notice of Allowance dated May 30, 2024.

(Continued)

*Primary Examiner* — Andrae S Allison
*Assistant Examiner* — Emmanuel Silva-Avina

(57) ABSTRACT

A method and system are disclosed for estimating and using a trailer angle of a trailer relative to a vehicle connected to thereto. The method includes receiving image data from at least one first camera disposed on a vehicle and from at least one second camera disposed on a trailer coupled to the vehicle, and identifying matched point pairs by matching points in the image data from the at least one first camera with points in the image data from the at least one second camera, the points matched not being points of a representation of the vehicle or a representations of the trailer in the image data. The trailer angle of the trailer relative to the vehicle is estimated based upon the matched point pairs.

18 Claims, 7 Drawing Sheets

(56) References Cited

U.S. PATENT DOCUMENTS

| | | | |
|---|---|---|---|
| 2019/0337343 | A1 | 11/2019 | Ramirez Llanos et al. |
| 2019/0347498 | A1* | 11/2019 | Herman .................. G08G 1/162 |
| 2020/0143174 | A1* | 5/2020 | Luo .......................... B60D 1/62 |
| 2020/0175311 | A1* | 6/2020 | Xu .......................... G06V 20/56 |
| 2020/0402257 | A1 | 12/2020 | Jin |
| 2021/0024144 | A1* | 1/2021 | Patnaik ............... B60W 60/001 |
| 2021/0027490 | A1 | 1/2021 | Taiana et al. |
| 2023/0227103 | A1* | 7/2023 | Okouneva ................ B60D 1/01 |
| | | | 701/28 |
| 2023/0245341 | A1* | 8/2023 | Kai ........................ G06T 17/05 |
| | | | 382/103 |

OTHER PUBLICATIONS

A. Hanel et al., "Calibration of a Vehicle Camera System with Divergent Fields-of-View in an Urban Environment," Jan. 1, 2017, retrieved from https://www.pf.bgu.tum.de/pub/2017/hanel_stilla_dgpf17_pap.pdf.

Natroshvilli et al., "Automatic Extrinsic Calibration Methods for Surround View Systems", 2017 IEEE Intelligent Vehicles Symposium (IV), Date of Conference: Jun. 11-14, 2017, DOI: 10.1109/IVS.2017.7995702.

Alexander Hanel et al, "Calibration of a Vehicle Camera System with Divergent Fields-of-view in an Urban Environment", Jan. 1, 2017.

Lionel Heng et al., "Infrastructure-based Calibration of a Multi-Camera Rig," 2014 IEEE International Conf. on Robotics & Automation (ICRA), May 31, 2014, pp. 4912-4919.

* cited by examiner

SYSTEM AND METHOD FOR ESTIMATING RELATIVE TRAILER ANGLE

TECHNICAL FIELD

This disclosure relates to operating a tow vehicle coupled to a trailer, and particularly to a system and method for estimating the trailer angle relative to a connected tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. Existing trailer assist systems associated with tow vehicles provide driving assistance when the tow vehicle and trailer are maneuvered in forward and reverse directions. A parameter and/or dimension of the trailer which is used by trailer assist systems is the trailer angle between the a fore-aft axis of the tow vehicle and the fore-aft axis of the trailer. For example, trailer assist systems may use the trailer angle to control the tow vehicle to prevent a jackknife event from occurring.

SUMMARY

The disclosure provides a method and system for estimating and using a trailer angle of a trailer relative to a vehicle connected to thereto. In accordance with an example embodiment, the method includes receiving image data from at least one first camera disposed on a vehicle and from at least one second camera disposed on a trailer coupled to the vehicle. Matched point pairs are identified by matching points in the image data from the at least one first camera with points in the image data from the at least one second camera. The point pairs are not points of a representation of the vehicle or a representations of the trailer in the image data. The method further includes estimating a trailer angle of the trailer relative to the vehicle based upon the matched point pairs.

The method may further include generating a three dimensional (3D) point cloud map from the image data from the at least one first camera. A pose of the vehicle within the 3D point cloud map is determined. The trailer angle is estimated based upon the pose of the vehicle within the 3D point cloud map.

In one aspect, the point matching includes matching 3D points in the 3D point cloud map with the image data of the at least one second camera.

The method may further include, based the 3D point cloud map and the matched point pairs, determining a pose of the trailer within the 3D point cloud map, wherein estimating the trailer angle is based upon the pose of the vehicle and the pose of the trailer. The method may also include determining a pose of the at least one first camera within the 3D point cloud map, wherein the pose of the vehicle is determined based upon the pose of the at least one first camera. Similarly, the method may also include determining a pose of the at least one second camera within the 3D point cloud map, wherein the pose of the trailer is determined based upon the pose of the at least one second camera.

The at least one second sensor may be mounted to the trailer so that the image data from the at least one second sensor captures a view rearward of the trailer.

Prior to receiving the image data from the at least one first camera and the at least one second camera, the vehicle is moved so that the image data from the at least one first camera captures a scene which at least partly overlaps a scene captured by the at least one second camera.

With the trailer angle estimated, the method may include controlling the vehicle based upon the estimated trailer angle.

In another example embodiment, there is disclosed a trailer assist system of a vehicle coupled to a trailer, the trailer reverse assist system including data processing hardware; and non-transitory memory hardware in communication with the data processing hardware, the non-transitory memory hardware storing instructions that when executed on the data processing hardware cause the data processing hardware to a method as described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch.

Figure 1A:
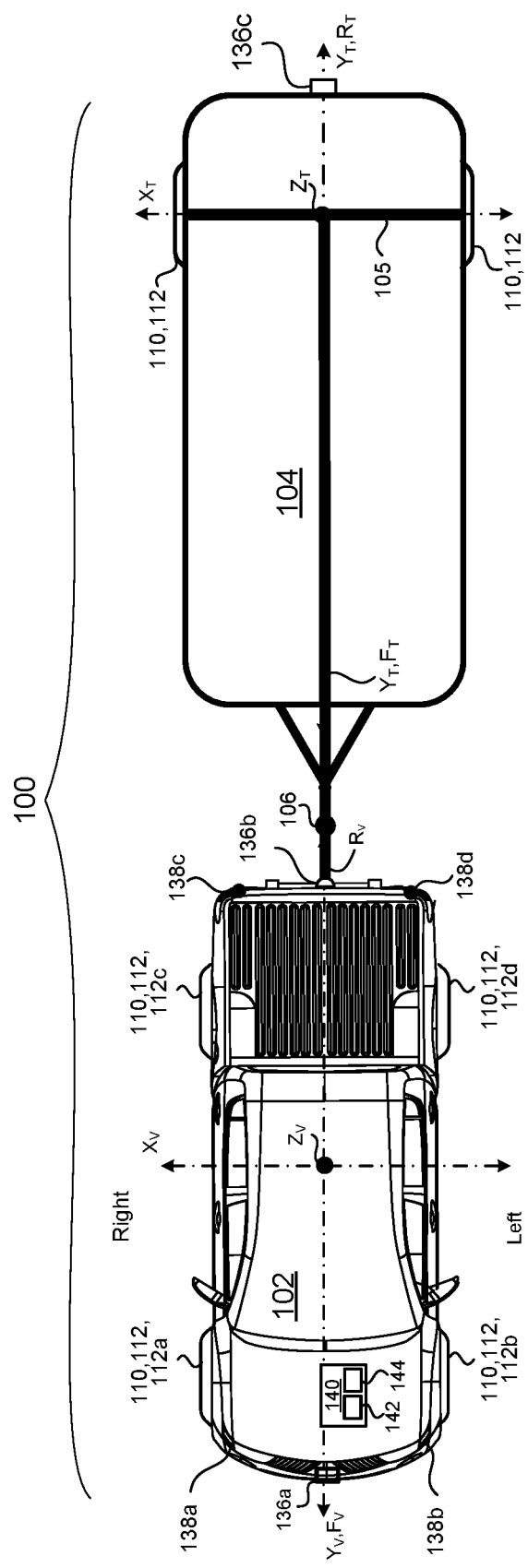
FIG. 1A is a top view of an exemplary tow vehicle hitched to a trailer.
Figure 1B:
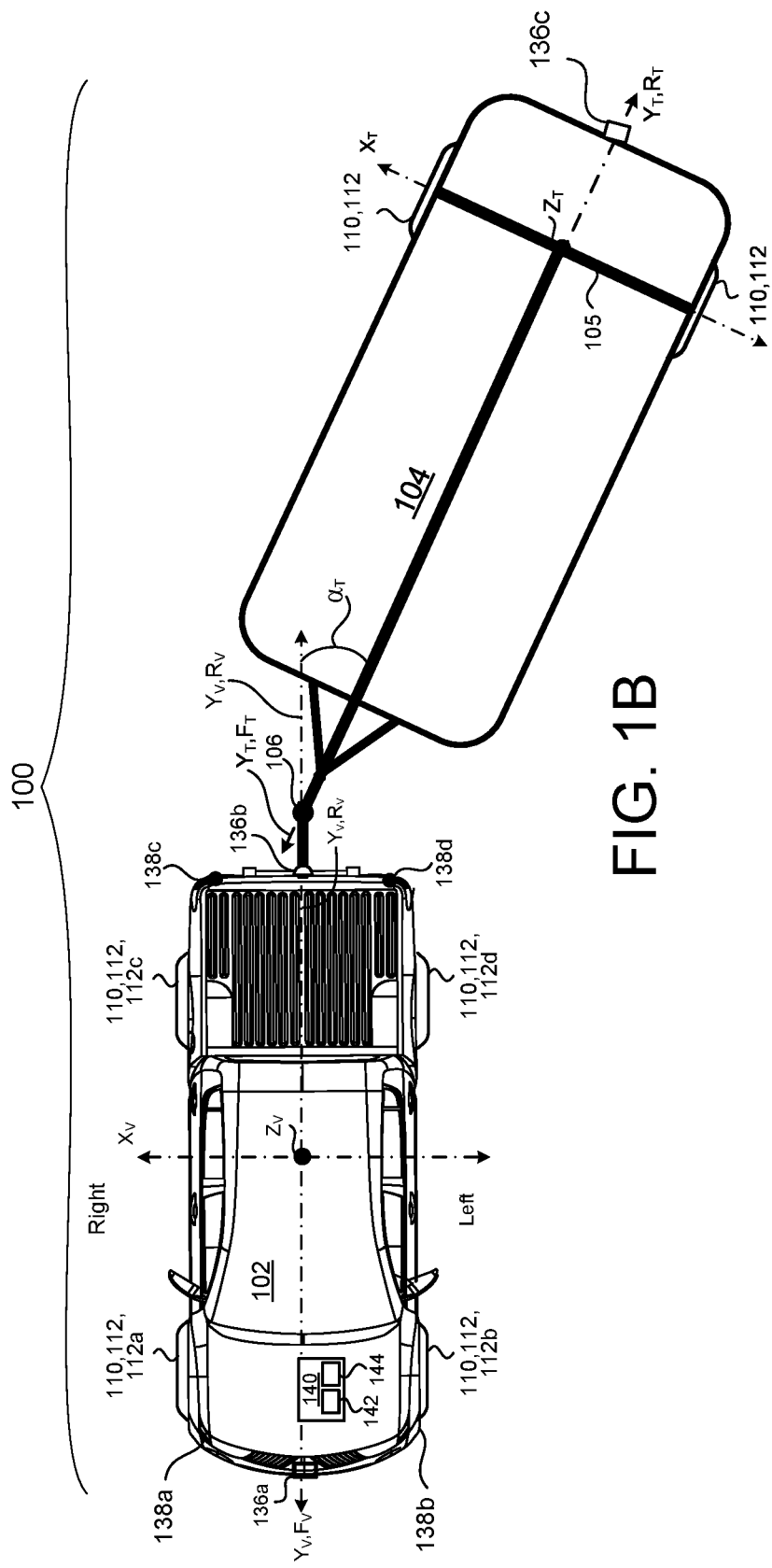
FIG. 1B is a top view of the exemplary tow vehicle and the trailer shown in FIG. 1A, where the trailer is at an angle with respect to the tow vehicle.
Figure 2:
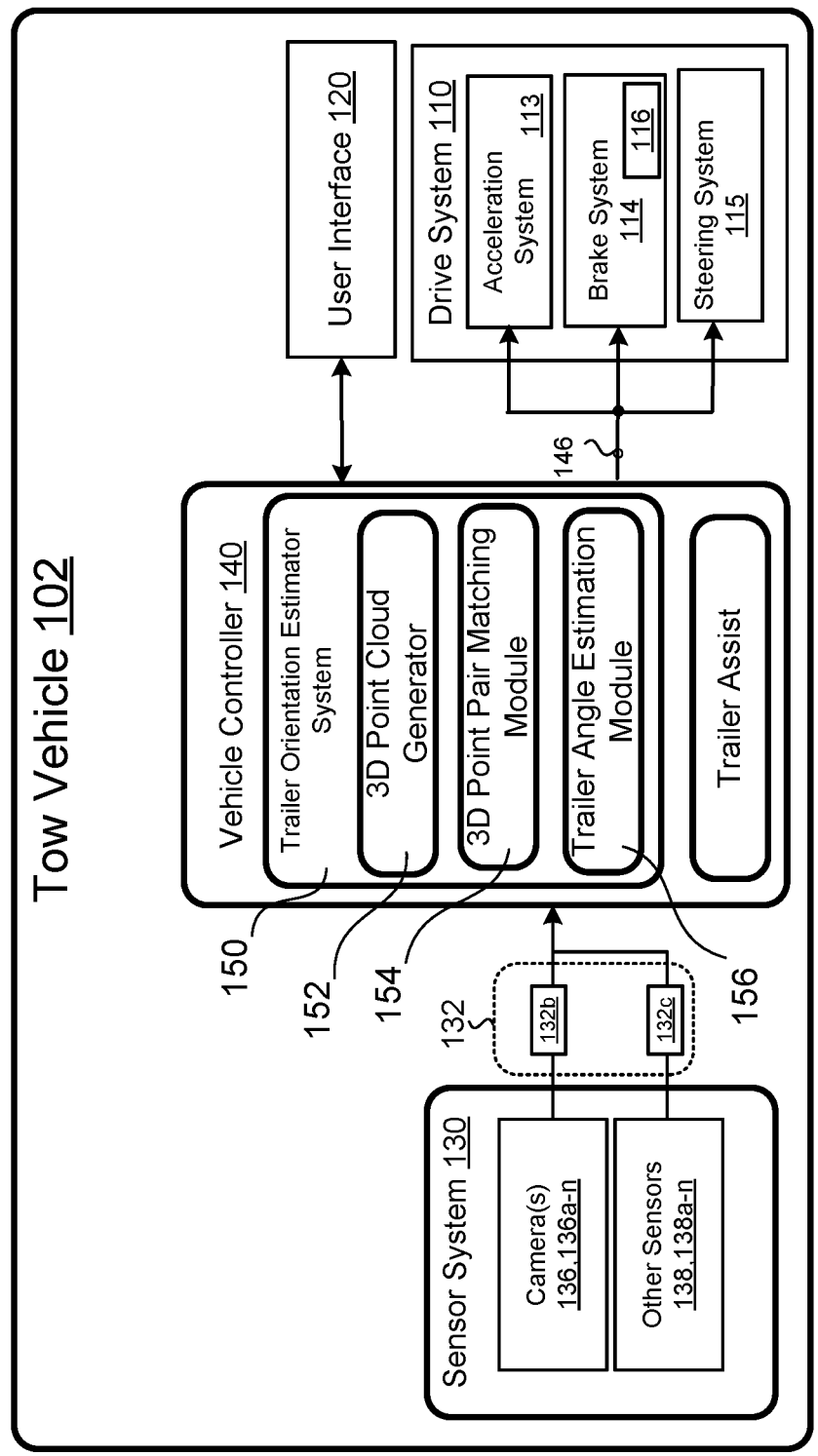
FIG. 2 is a schematic view of the tow vehicle of FIGS. 1A and 1B including a trailer assist system according to an example embodiment.

Referring to FIGS. 1A, 1B and 2, in some implementations, a vehicle-trailer system 100 includes a tow vehicle 102 hitched to a trailer 104 by way of a hitch 106. The tow vehicle 102 includes a drive system 110 associated with the tow vehicle 102 that maneuvers the tow vehicle 102 and thus the vehicle-trailer system 100 across a road or other surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 includes other components (not shown) that are in communication with and connected to the wheels 112 that allow the tow vehicle 102 to move, thus moving the trailer 104 as well. The drive system 110 may also include a brake system 114 that includes brakes 116 associated with each wheel 112, 112*a-d*, where each brake 116 is associated with a wheel 112*a-d* and is configured to slow down or stop the wheel 112*a-n* from rotating. In some examples, the brake system 114 is connected to one or more brakes 116 supported by the trailer 104. The drive system 110 may also include an acceleration system 113 that is configured to adjust a speed of the tow vehicle 102 and thus the vehicle-trailer system 100, and a steering system 115 that is configured to adjust a direction of the tow vehicle 102 and thus the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along.

Moreover, the connected trailer 104 follows the tow vehicle 102 across the road surface by various combinations of movements relative to three mutually perpendicular axes defined by the trailer 104: a trailer transverse (pitch) axis $X_T$, a trailer fore-aft (roll) axis $Y_T$, and a trailer central vertical (yaw) axis $Z_T$. The trailer transverse axis $X_T$ extends between a right side R and a left side of the trailer 104, for example, along the trailer axle 105. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form a trailer angle $\alpha_T$ being an angle between the vehicle fore-aft axis $Y_V$ and the trailer fore-aft axis $Y_T$.

The tow vehicle 102 may include a user interface 120, such as a display. The user interface 120 is configured to display information to the driver. In some examples, the user interface 120 is configured to receive one or more user commands from the driver via one or more input mechanisms and/or displays one or more notifications to the driver. In some examples, the one or more input mechanisms of the user interface 120 is a touch screen display. In other examples, the one or more input mechanisms of the user interface 120 is not a touchscreen and the driver may use an input device, such as, but not limited to, a rotary knob or a mouse to make a selection or otherwise provide information.

In some implementations, the tow vehicle 102 includes a sensor system 130 to provide sensor system data 132 that may be used to determine one or more measurements associated with an environment of the tow vehicle 102, the trailer 104, and/or objects surrounding the tow vehicle 102. In some examples, the tow vehicle 102 may be autonomous or semi-autonomous, therefore, the sensor system 130 provides for reliable and robust autonomous driving. The sensor system 130 may include different types of sensors that may be used separately or with one another to create a perception of the tow vehicle's environment or a portion thereof that is used by the vehicle-trailer system 100 to determine measurements and/or identify object(s) in its environment and/or in some examples autonomously drive and make intelligent decisions based on objects and obstacles detected by the sensor system 130. In some examples, the sensor system 130 is supported by the rear portion of the tow vehicle 102 and provides sensor system data 132 associated with object(s) and the trailer 104 positioned behind the tow vehicle 102. The sensor system 130 is supported by both the tow vehicle 102 and the trailer 104. The sensor system 130 may include sensor(s) positioned on the rear vehicle bumper 108 and/or on the front bumper (not shown). In some examples, the sensor system 130 may also include sensor(s) positioned on a rear portion of the trailer 104.

In some implementations, the sensor of the sensor system 130 includes one or more imaging devices 136, 136*a-n*, such as cameras. The one or more cameras 136, 136*a-n* captures images of an environment of the tow vehicle 102. In the illustrated example embodiments, imaging devices 136*a-n* includes a camera 136*a* supported or mounted to the front bumper of the tow vehicle 102, a camera 136*b* supported/mounted to the rear bumper of the tow vehicle 102, and a camera 136*c* mounted along a rear or the trailer 104. It is understood that the sensor system 130 may include additional cameras/imaging devices. In the example embodiments and as explained in greater detail below, the scene captured by the camera 136*c* of the trailer 104 at least partly overlaps the scene captured by at least one of the tow vehicle cameras 136*a* or 136*b*.

In some implementations, the sensor system 130 includes other sensors 138, 138*a-n* such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, etc. In the example embodiment illustrated in FIGS. 1A and 1B, the sensors 138*a-d* are positioned on the front and rear portions of the tow vehicle 102.

The sensor system 130 provides sensor system data 132 that includes camera image(s) 132*b* captured by the camera(s) 136, and sensor data 132*c* captured by the other sensors 138. Therefore, the sensor system 130 is especially useful for receiving information of the environment or portion of the environment of the vehicle 102 and for increasing safety in the vehicle-trailer system 100 which may operate by the driver, or under semi-autonomous or autonomous conditions.

The drive system 110, the user interface 120, and the sensor system 130 are in communication with a vehicle controller 140 that includes a computing device (or data processing hardware) 142 (e.g., central processing unit having one or more computing processors) in communication with non-transitory memory or hardware memory 144 (e.g., a hard disk, flash memory, random-access memory) capable of storing program code instructions executable on the computing processor(s)). The computing device 142 and the memory 144 may form a controller and/or microcontroller of an electronics control unit for the tow vehicle 102.

In some examples, the non-transitory memory 144 stores program code instructions that when executed on the computing device 142 cause the vehicle controller 140 to provide signals or commands 146 which control at least part of the tow vehicle 102 when executing forward and/or reverse maneuvers, either autonomously or semi-autonomously, as described herein. Such instructions may form at least part of a trailer assist system along with the vehicle controller 140, the drive system 110 (including the acceleration system 113, the brake system 114 and the steering system 115) and the sensor system 130. As shown, the vehicle controller 140 is supported by the tow vehicle 102; however, the vehicle controller 140 may be separate from the tow vehicle 102 and in communication with the tow vehicle 102 via a network (not shown).

Knowledge of the pose, i.e., position and orientation, of the trailer 104 relative to the tow vehicle 102 is helpful and often necessary when operating the tow vehicle 102 in forward and/or reverse maneuvers in autonomous or semi-autonomous modes of operation. For example, knowledge of the relative position and/or orientation of the trailer 104 may be used by the vehicle controller 140 in controlling the tow vehicle 102 to prevent a jackknife event from occurring. Example embodiments are generally directed to a trailer orientation estimator system 150 for determining the orientation of the trailer 104 relative to the tow vehicle 102 based upon image data generated by cameras 136 of the tow vehicle 102 and the trailer 104, without the need for identifying features of the tow vehicle or the trailer in the image data.

Figure 3:
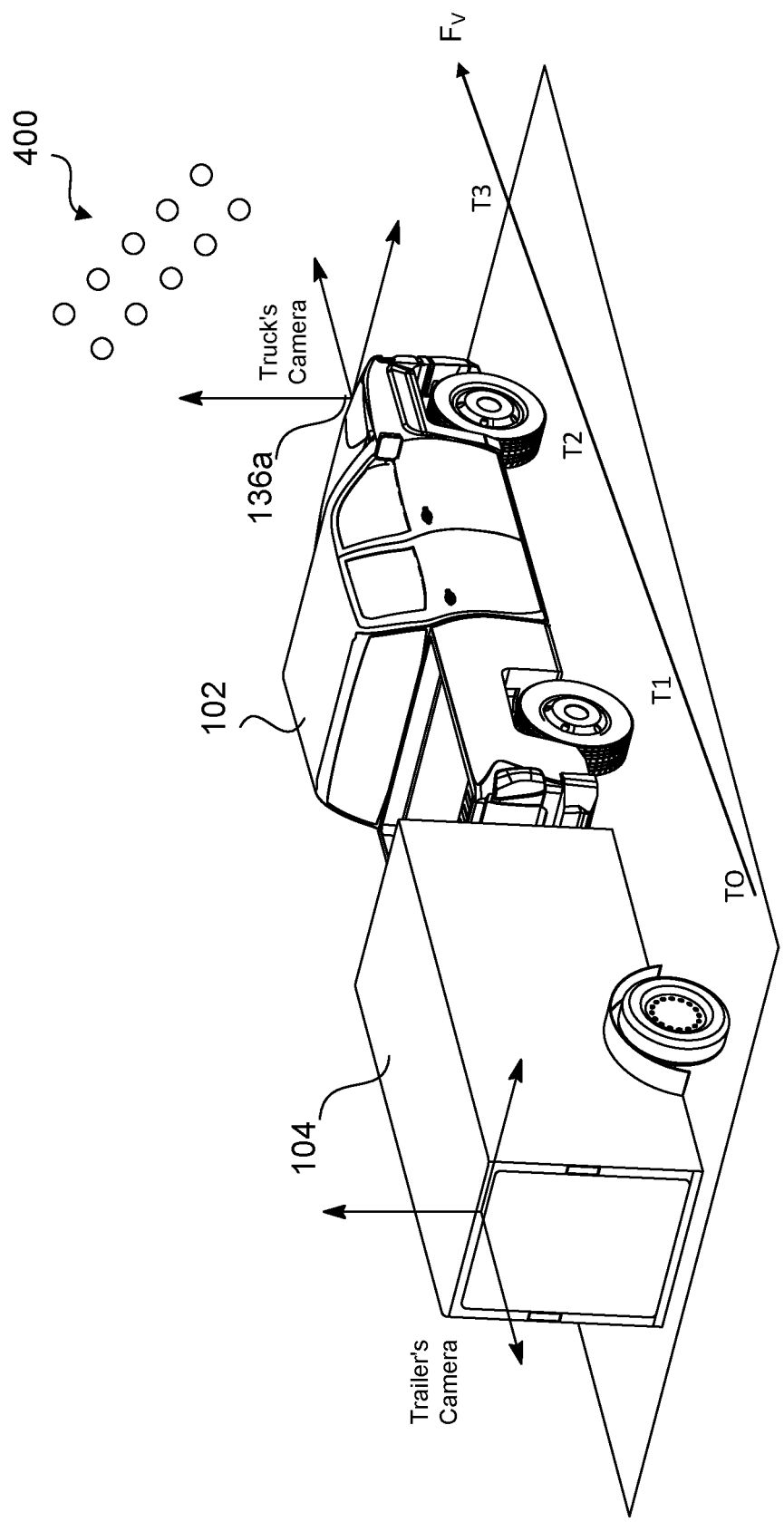
FIGS. 3-5 depict the operation of a trailer orientation estimator system of a tow vehicle according to an example embodiment.

In one example embodiment, at least one vehicle camera 136a or 136b (i.e., cameras 136a and/or 136b) mounted on the tow vehicle 102 generates images of a scene in the field of view of the camera, and sends the images to the vehicle controller 140. The trailer orientation estimator system 150 includes a point cloud generator 152 which receives the images, i.e., image data, from at least one of the cameras 136a or 136b and generates a three dimensional (3D) point cloud 400 based upon the received image data. The 3D point cloud 400 may be sparse, semi-dense or dense. FIG. 3 illustrates the 3D point cloud 400 generated by image data captured by camera 136a of the tow vehicle 102 as the tow vehicle 102 moves in the forward direction $F_V$ from time T0 to time T3. Generating the 3D point cloud 400 includes executing one of a visual odometry (VO) algorithm, a simultaneous localization and mapping (SLAM) algorithm, or a structure from motion (SfM) algorithm. In some examples, the vehicle controller 140 initializes the data processing hardware 142 before executing the algorithms by: sending, from the data processing hardware to the drive system 110, instructions causing the tow vehicle 102 to drive in a forward or a rearward direction, such as a straight forward or straight reverse direction, for a predefined distance. It is understood driving the tow vehicle 102 in other than a straight forward or straight reverse direction to initialize the data processing hardware 142 may require additional information, such as information of the steering wheel angle.

The 3D point cloud generator 152 analyzes the sequences of images 132b received from at least one of camera 136a or camera 136b of the tow vehicle 102. The VO, SLAM or SfM frameworks, which are well established theories, allow the vehicle to localize in a real-time in a self-generated 3D point cloud map. This includes determining a camera pose of at least one tow vehicle camera 136a or 136b in the 3D point cloud 400 and/or the related point cloud map. With the camera pose of the tow vehicle camera(s) 136a and/or 136b as well as the intrinsic parameters of the tow vehicle camera(s), the 3D point cloud generator 152 determines the heading of the tow vehicle 102.

Figure 4:
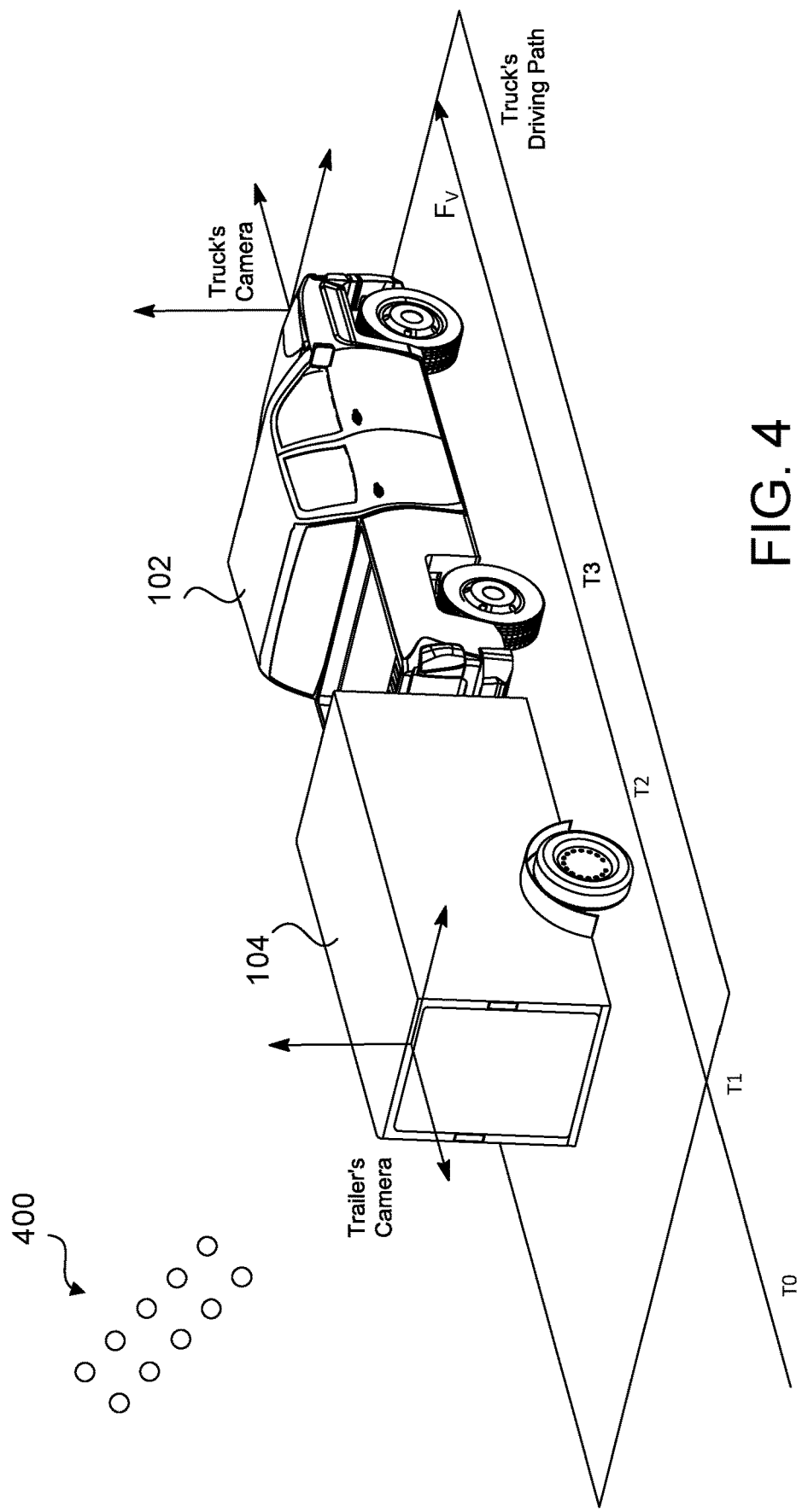

While the vehicle controller 140 of the tow vehicle 102 receives data captured by the tow vehicle cameras 136a and/or 136b, the camera 136c on the trailer 104 similarly captures image data and sends the data to the vehicle controller 140 as the trailer 104 moves in the forward direction $F_T$ from time T0 towards time T3, as shown in FIG. 4. In moving in the forward direction $F_T$, in this case, the tow vehicle cameras 136a and/or 136b and the trailer camera 136c enter the same space and see much of the same objects in the same scene. In other words, the scenes captured by the trailer camera 136c at least partly overlaps the scenes captured by the tow vehicle camera(s) 136a and/or 136b.

Figure 5:
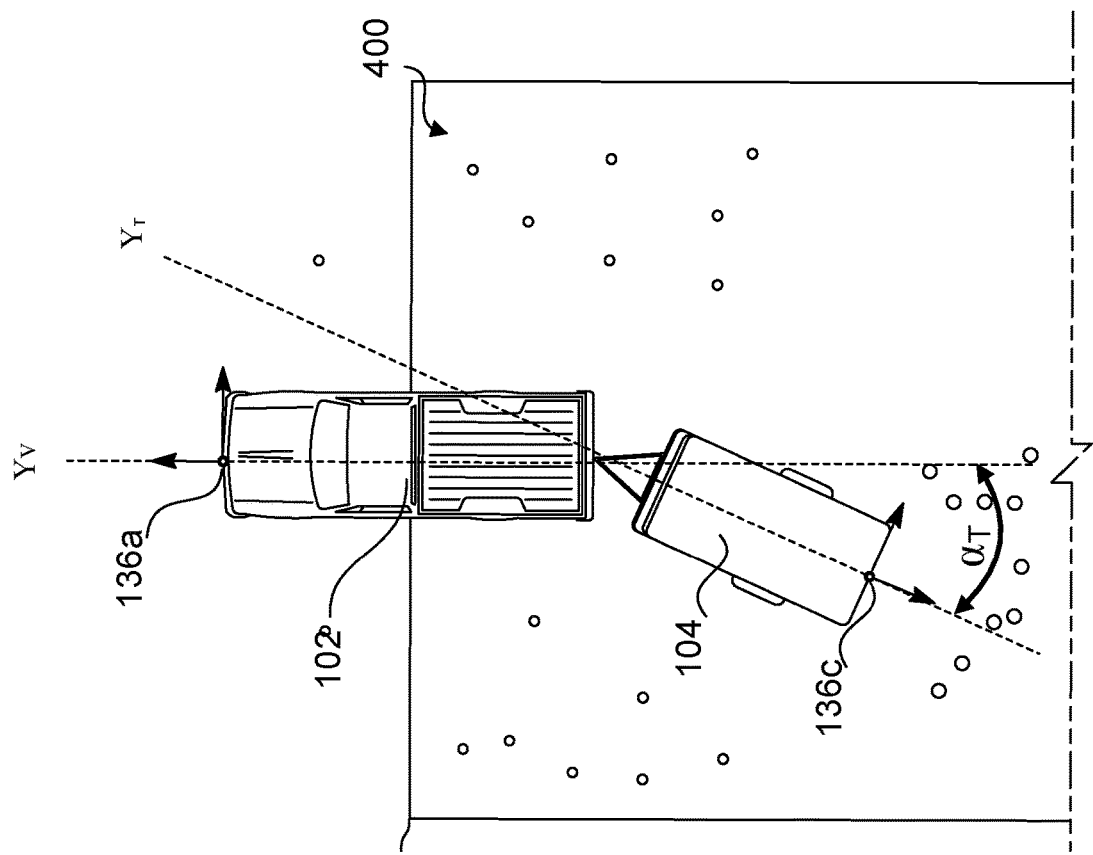

The trailer orientation estimator system 150 further includes a point pair matching module 154 which, in one aspect, identifies matched point pairs by matching points from the 2D images generated by the trailer camera 136c with points in the 2D images generated by at least one tow vehicle camera 136a and/or 136b. In one implementation, the point pair matching module 154 may utilize a bag-of-words model to match points found in the images from both the vehicle camera(s) and the trailer camera(s). The matched point pairs in the 2D images are of representations of objects in the environment of the tow vehicle 102 and the trailer 104 which are not representations of the tow vehicle 102 or of the trailer 104. FIGS. 4 and 5 illustrate instances during which matched point pairs are identified.

The trailer orientation estimator system 150 further includes a trailer angle estimator module 156 which determines the orientation of the trailer 104 relative to the tow vehicle 102 based at least partly upon the matched point pairs. Specifically, the trailer angle estimator module 156 uses the 3D point cloud map and the matched point pairs to determine the camera pose of the camera(s) 136c of the trailer 104, which is used along with the intrinsic parameters of the trailer camera(s) 136c to determine the heading and/or pose of the trailer 104 within the 3D point cloud map. The trailer orientation estimator system 150 determines the trailer angle $\alpha_T$ formed between the fore-aft axis Yv of the tow vehicle 102 and the fore-aft axis $Y_T$ of the trailer 104 based upon the heading of both the tow vehicle 102 and the trailer 104. FIG. 5 illustrates the trailer angle $\alpha_T$ formed between the fore-aft axis Yv of the tow vehicle 102 and the fore-aft axis $Y_T$ of the trailer 104, based upon matched point pairs in the 3D point cloud 400.

The example embodiments illustrate the use of a single trailer camera 136c for use in determining the trailer angle $\alpha_T$ of the trailer 104. It is understood that one or more trailer cameras 136c may be used, and that the trailer camera(s) 136c may be mounted to the trailer 104 at different locations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Figure 6:
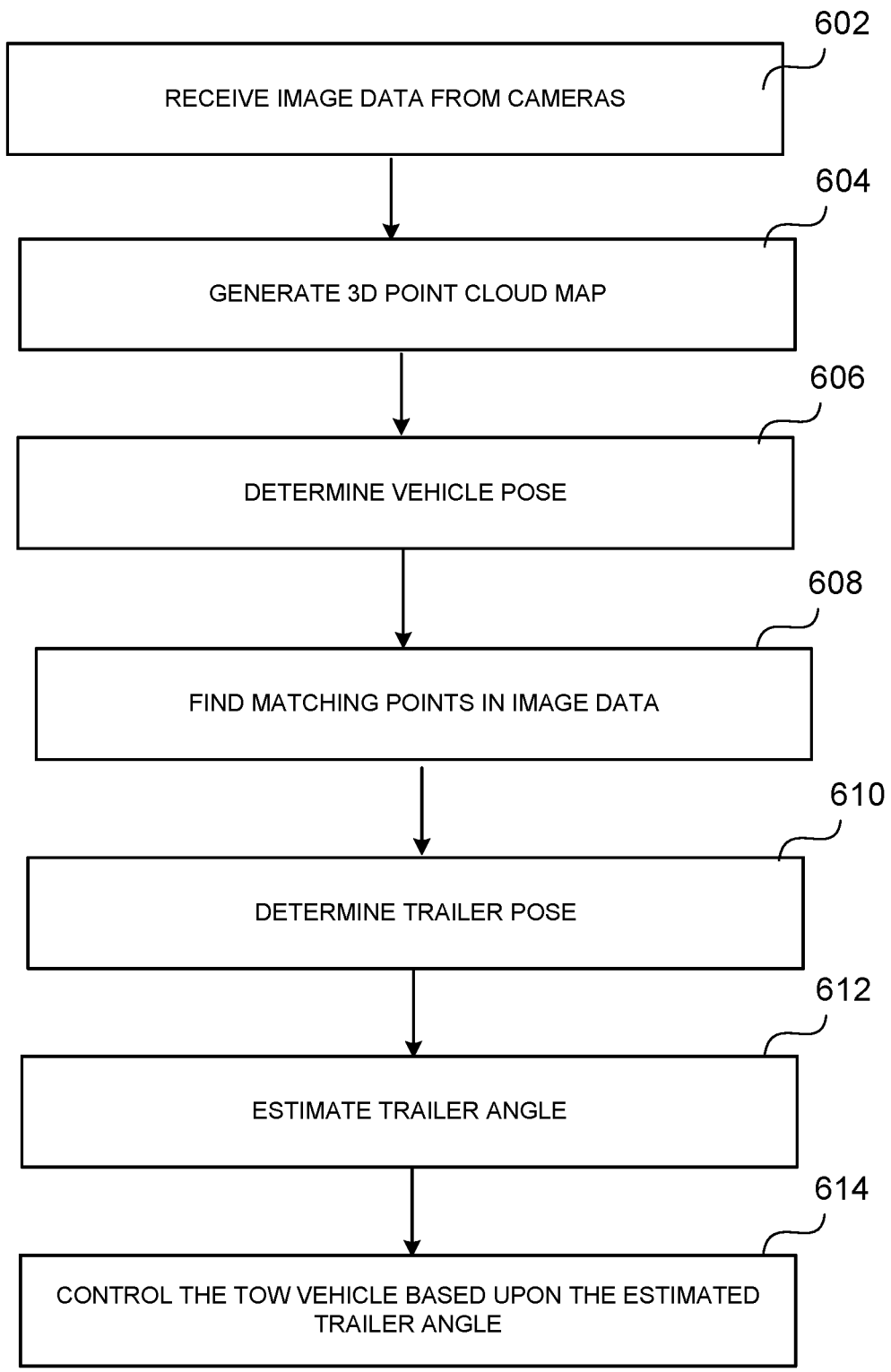
FIG. 6 is a flowchart illustrating the operation of the trailer orientation estimator system of FIGS. 3-5 according to an example embodiment.

FIG. 6 is a flowchart illustrating the operation of the trailer orientation estimator system 150 according to an example embodiment. At 602, image data from vehicle cameras 136a and/or 136b, and from trailer camera 136c, are received at the vehicle controller 140. At 604, the 3D point cloud generator 152 generates a 3D point cloud 400 and corresponding point cloud map based upon the image data received from the vehicle camera(s) 136a and/or 136b. At least one of the known frameworks discussed above may be utilized for generating the 3D point cloud 400 and map. The heading and/or pose of the tow vehicle 102 is generated at 606 based upon the 3D point cloud 400 and/or corresponding 3D point cloud map. Specifically, the heading/pose of the vehicle camera(s) 136a and/or 136b may be determined from the 3D point cloud 400, from which the pose/heading of the tow vehicle 102 is determined based upon the 3D point cloud 400 and the intrinsic parameters of the vehicle camera(s) 136a and/or 136b.

The point pair matching module 154 identifies at 608 feature point pairs in which points in the image data generated by the tow vehicle camera(s) 136a and/or 136b match feature points in the image data generated by the trailer camera(s) 136c. The trailer angle estimation module 156 determines at 612 the pose and/or heading of the trailer 104 based upon the matched feature points and the 3D point cloud 400. Specifically, the heading/pose of the trailer camera(s) 136c may be determined from the 3D point cloud 400, from which the pose/heading of the trailer 104 is determined based upon the 3D point cloud 400 and intrinsic parameters of the trailer camera(s) 136c.

Based upon the poses of the tow vehicle 102 and the trailer 104, the trailer angle estimation module 156 determines the trailer angle $\alpha_T$ of the trailer 104 based upon the heading/pose of the tow vehicle 102 and the heading/pose of the trailer 140. The vehicle controller 140 may then be used at 614 in the control of the tow vehicle 102 based upon the estimated trailer angle $\alpha_T$ of the trailer 104.

The trailer orientation estimator system 150 does not need to be calibrated using a dynamic calibration method that gives trailer and tow vehicle parameters; and does not require a target placed on the trailer 104. The trailer orientation estimator system 150 uses 3D points of the 3D point cloud 400 found in the scene to deduce the relative trailer angle of the trailer 104. No initial trailer angle is needed. No features of the trailer 104 need to be determined; instead, any points in the 3D point cloud 400 are used to determine heading angles of the tow vehicle 102 and trailer 104. The estimated trailer angle is provided in a 3D world which may be useful for trailer parking maneuvers by the vehicle controller 140.

The trailer orientation estimator system 150 advantageously uses the generated 3D point cloud 400 to determine the relative trailer angle of the trailer 104.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing hardware apparatus. The computer readable medium can be a machine-readable storage device, a machine-readable storage substrate, a memory device, a composition of matter effecting a machine-readable propagated signal, or a combination of one or more of them. The terms "data processing apparatus", "data processing hardware," "computing device" and "computing processor" encompass all apparatus, devices, and machines for processing data, including by way of example a programmable processor, at least one processor core, a controller or microcontroller, a computer, or multiple processors or computers. The system or apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for estimating and using a trailer angle of a trailer relative to a vehicle connected to thereto, comprising:
   receiving, by data processing hardware including at least one processor, image data from at least one first camera disposed on a vehicle and from at least one second camera disposed on a trailer coupled to the vehicle, the image data from the at least one second camera being two dimensional image data;
   identifying, by the data processing hardware, matched point pairs by matching points in the image data from the at least one first camera with points in the image data from the at least one second camera, the points matched not being points of a representation of the vehicle in the image data and not being points of a representation of the trailer in the image data;
   estimating, by the data processing hardware, a trailer angle of the trailer relative to the vehicle based upon the matched point pairs;

providing, by the data processing hardware, at least one command to control at least part of the vehicle based upon the estimated trailer angle;
generating, by the data processing hardware, a three dimensional (3D) point cloud map from the image data from the at least one first camera;
determining, by the data processing hardware, a pose of the vehicle within the 3D point cloud map, wherein the trailer angle is estimated based upon the pose of the vehicle within the 3D point cloud map; and
based on the 3D point cloud map and the matched point pairs, determining, by the data processing hardware, a pose of the trailer within the 3D point cloud map, wherein estimating the trailer angle is based upon the pose of the vehicle and the pose of the trailer,
wherein matching points in the image data from the at least one first camera with points in the image data from the at least one second camera comprises matching 3D points in the 3D point cloud map with points of the image data of the at least one second camera,
wherein the trailer angle is estimated using the method without identifying features of the tow vehicle or the trailer in the image data.

2. The method of claim 1, further comprising:
determining, by the data processing hardware, a pose of the at least one first camera within the 3D point cloud map, wherein the pose of the vehicle is determined based upon the pose of the at least one first camera and intrinsic parameters thereof; and
determining, by the data processing hardware, a pose of the at least one second camera within the 3D point cloud map, wherein the pose of the trailer is determined based upon the pose of the at least one second camera and intrinsic parameters thereof.

3. The method of claim 1, wherein the at least one second camera captures a view rearward of the trailer.

4. The method of claim 1, further comprising moving the vehicle so that the image data from the at least one first camera captures a scene which at least partly overlaps a scene captured by the at least one second camera.

5. A trailer system of a vehicle coupled to a trailer, the trailer assist system comprising:
non-transitory memory hardware, the non-transitory memory hardware storing instructions that when executed on data processing hardware cause the data processing hardware to perform operations comprising:
receiving image data from at least one first camera disposed on a vehicle and from at least one second camera disposed on a trailer coupled to the vehicle, the image data from the at least one second camera comprising two-dimensional image data;
identifying matched point pairs by matching points in the image data from the at least one first camera with points in the image data from the at least one second camera, the matched points not being points of a representation of the vehicle in the image data and not being points of a representations of the trailer in the image data, the identifying of the matched point pairs comprising using a bag-of-words model to match the point pairs;
estimating a trailer angle of the trailer relative to the vehicle based upon the matched point pairs; and
providing at least one signal or command to control the vehicle based upon the estimated trailer angle,
generating a three dimensional (3D) point cloud map from the image data from the at least one first camera; and
determining a pose of the vehicle within the 3D point cloud map,
wherein the trailer angle is estimated based upon the pose of the vehicle w thin the 3D point cloud map, and
wherein matching the points comprises matching 3D points in the 3D point cloud map with points in the image data of the at least one second camera, and
wherein the trailer angle is estimated by the trailer system without identifying features of the tow vehicle or the trailer in the image data.

6. The trailer assist system of claim 5, wherein the instructions stored in non-transitory memory, when executed by the data processing hardware, cause the data processing hardware to perform operations further comprising, based the 3D point cloud map and the matched point pairs, determining a pose of the trailer within the 3D point cloud map, wherein estimating the trailer angle is based upon the pose of the vehicle and the pose of the trailer.

7. The trailer assist system of claim 6, wherein the instructions stored in non-transitory memory, when executed by the data processing hardware, cause the data processing hardware to perform operations further comprising:
determining a pose of the at least one first camera within the 3D point cloud map, wherein the pose of the vehicle is determined based upon the pose of the at least one first camera and intrinsic parameters of the at least one first camera; and
determining a pose of the at least one second camera within the 3D point cloud map, wherein the pose of the trailer is determined based upon the pose of the at least one second camera and intrinsic parameters of the at least one second camera.

8. The trailer assist system of claim 5, wherein the instructions stored in non-transitory memory, when executed by the data processing hardware, cause the data processing hardware to perform operations further comprising determining a pose of the at least one first camera within the 3D point cloud map, wherein the pose of the vehicle is determined based upon the pose of the at least one first camera.

9. The trailer assist system of claim 5, wherein the instructions stored in non-transitory memory, when executed by the data processing hardware, cause the data processing hardware to perform operations further comprising moving the vehicle so that the image data from the at least one first camera captures a scene which at least partly overlaps a scene captured by the at least one second camera.

10. The method of claim 1, wherein the received image data used to generate the 3D point cloud map and used in the matching is received only from the at least one first camera and the at least one second camera, without image data from sources that are not disposed on the vehicle and not disposed on the trailer.

11. The trailer assist system of claim 5, wherein the received image data used to generate the 3D point cloud map and used in the matching is received only from the at least one first camera and the at least one second camera, without image data from sources that are not disposed on the vehicle or the trailer.

12. A program code product for a vehicle coupled to a trailer, the trailer assist program code product maintained in a non-transitory memory and including instructions which, when executed by at least one processor, causes the at least one processor to perform operations comprising:
receiving image data from at least one first camera disposed on a vehicle and from at least one second camera disposed on a trailer coupled to the vehicle;
generating a three dimensional (3D) point cloud map from the image data from the at least one first camera;

determining a pose of the vehicle within the 3D point cloud map;

identifying matched point pairs by matching points in the image data of the at least one second camera with 3D points in the 3D point cloud map, the matched points not being points of a representation of the vehicle in the image data and not being points of a representations of the trailer in the image data, wherein identifying the matched point pairs comprising using a bag-of-words model to match the point pairs;

estimating a trailer angle of the trailer relative to the vehicle based upon the matched point pairs; and providing at least one signal to at least partly control movement of the vehicle based in part upon the estimated trailer angle, wherein the operations performed by the at least one processor further include determining a pose of the trailer within the 3D point cloud map based the 3D point cloud map and the matched point pairs, wherein estimating the trailer angle is based upon the pose of the vehicle and the pose of the trailer, and wherein the trailer angle is estimated by program code product without identifying features of the tow vehicle or the trailer in the image data.

13. The program code product of claim 12, wherein the received image data used to generate the 3D point cloud map and used in the matching is received only from the at least one first camera and the at least one second camera, without image data from cameras that are not disposed on the vehicle or on the trailer.

14. The method of claim 1, wherein identifying of the matched point pairs comprises using a bag-of-words model to match the point pairs.

15. The method of claim 1, wherein the at least one first camera is a front vehicle camera that captures an environment forwardly of the vehicle, and the at least one second camera is a rear trailer camera that captures an environment rearwardly of the trailer.

16. The trailer system of claim 5, wherein the at least one first camera is a front vehicle camera that captures an environment forwardly of the vehicle, and the at least one second camera is a rear trailer camera that captures an environment rearwardly of the trailer.

17. The program code product of claim 12, wherein the at least one first camera is a front vehicle camera that captures an environment forwardly of the vehicle, and the at least one second camera is a rear vehicle camera that captures an environment rearwardly of the trailer.

18. The program code product of claim 12, wherein the image data from the at least one second camera is two dimensional image data.

* * * * *